United States Patent
Witte et al.

(10) Patent No.: US 9,822,881 B2
(45) Date of Patent: Nov. 21, 2017

(54) METHOD AND APPARATUS FOR HANDLING A PRODUCT

(71) Applicant: LIST HOLDING AG, Arisdorf (CH)

(72) Inventors: Daniel Witte, Grenzach-Wyhlen (DE); Alfred Kunz, Muttenz (CH)

(73) Assignee: List Holding AG, Arisdorf (CH)

( * ) Notice: Subject to any disclaimer, the term of this patent is extended or adjusted under 35 U.S.C. 154(b) by 479 days.

(21) Appl. No.: 14/414,243

(22) PCT Filed: Jul. 10, 2013

(86) PCT No.: PCT/EP2013/064532
§ 371 (c)(1),
(2) Date: Jan. 12, 2015

(87) PCT Pub. No.: WO2014/009393
PCT Pub. Date: Jan. 16, 2014

(65) Prior Publication Data
US 2015/0204445 A1 Jul. 23, 2015

(30) Foreign Application Priority Data
Jul. 11, 2012 (DE) .................. 10 2012 106 239

(51) Int. Cl.
*F16J 15/16* (2006.01)
*F16J 15/18* (2006.01)
(Continued)

(52) U.S. Cl.
CPC ............ *F16J 15/162* (2013.01); *B29B 7/401* (2013.01); *B29B 7/50* (2013.01); *B29B 7/80* (2013.01);
(Continued)

(58) Field of Classification Search
CPC .. B29B 7/50; B29B 7/80; B29B 7/401; B29B 7/58; F16J 15/162; F16J 15/187; F16J 15/182; F16J 15/18
See application file for complete search history.

(56) References Cited

U.S. PATENT DOCUMENTS 2,684,274 A 7/1954 Saxon
2,864,631 A 12/1958 Kemp
(Continued)

FOREIGN PATENT DOCUMENTS

AT 326435 B 12/1975
AT 334328 B 1/1976
(Continued)

OTHER PUBLICATIONS

International Search Report for PCT/EP2013/064532 dated Oct. 10, 2013.

*Primary Examiner* — Tony G Soohoo
(74) *Attorney, Agent, or Firm* — Bachman & LaPointe, PC

(57) ABSTRACT

A method for handling a product, in particular a viscous, pasty product, with at least one rotating shaft (3, 11) in a product space (5), a driving spindle (11) of the shaft (3) is mounted and sealed outside the product space (5) in a housing consisting of a plurality of parts (7, 8, 12). The sealing is brought about by at least two seals (2, 4), wherein a dynamic seal (2) follows an eccentric movement of the shaft (3) and takes on dynamic sealing of the rotating shaft (3), while another seal (4) compensates for an eccentric movement of the shaft (3) in relation to the housing by plastic or elastic deformation and therefore prevents a leakage between the housing part (12), which moves eccentrically, and a rigid housing (10). A defined quantity of liquid, which serves as a blocking agent and lubricant for the dynamic seal (2) of the shaft (3) towards the housing part (Continued)

(7), is metered in here, the liquid, apart from a residual excess, being drawn into the dynamic seal (2) by a pressure difference therewithin and thereby forming an effective block and seal.

12 Claims, 2 Drawing Sheets

(51) Int. Cl.
    *B29B 7/40*     (2006.01)
    *B29B 7/50*     (2006.01)
    *B29B 7/58*     (2006.01)
    *B29B 7/80*     (2006.01)
    *B01F 15/00*     (2006.01)

(52) U.S. Cl.
    CPC ............ *F16J 15/18* (2013.01); *F16J 15/182* (2013.01); *F16J 15/187* (2013.01); *B01F 2015/0011* (2013.01); *B01F 2015/00084* (2013.01); *B29B 7/58* (2013.01)

(56) References Cited

U.S. PATENT DOCUMENTS

| | | | |
|---|---|---|---|
| 2,977,098 A * | 3/1961 | Watson | B29B 7/425 159/2.2 |
| 3,687,422 A | 8/1972 | List | |
| 3,880,407 A | 4/1975 | List | |
| 4,484,753 A | 11/1984 | Kalsi | |
| 5,147,135 A | 9/1992 | List et al. | |
| 5,407,266 A | 4/1995 | Dötsch et al. | |
| 2005/0001383 A1 | 1/2005 | List et al. | |

FOREIGN PATENT DOCUMENTS

| | | | |
|---|---|---|---|
| CH | 506322 A | | 4/1971 |
| CH | 658798 A5 | | 12/1986 |
| CH | 686406 A5 | | 3/1996 |
| CN | 201552666 U | | 8/2010 |
| DE | 19940521 A1 | | 4/2001 |
| DE | 101 53 293 A1 | | 5/2003 |
| EP | 0517068 A1 | | 12/1992 |
| GB | 348321 A | | 5/1931 |
| GB | 749957 | * | 6/1956 |
| GB | 1081867 A | | 9/1967 |
| GB | 1088035 A | | 10/1967 |

* cited by examiner

METHOD AND APPARATUS FOR HANDLING A PRODUCT

BACKGROUND OF THE INVENTION

The invention relates to a method for processing a product, in particular a highly viscous, pasty product, by means of at least one rotating shaft in a product space, wherein a drive axle of the shaft is mounted and sealed outside of the product space, in a housing composed of a plurality of parts, and the sealing is effected by at least two seals, wherein a dynamic seal follows an eccentric motion of the shaft and effects dynamic sealing of the rotating shaft, while another seal, by plastic or elastic deformation, compensates an eccentric motion of the shaft in relation to the housing and thus prevents an untightness between the eccentrically moving housing part and a rigid housing, and to an apparatus therefor.

Conventional agitator vessels each consist of an agitating element, and of a vessel, in which the agitating element rotates. The vessel serves to close off the product space from the environment, such that substances cannot enter the vessel from the environment, or cannot escape from the product space into the environment. This refers to an open vessel, if the product in the vessel is sufficiently heavy, such that it remains in the vessel as a result of gravity, and consequently the vessel is open upwardly.

The drive of the agitator element must be designed such that the product does not escape via the shaft, or drive axle. In the case of an open vessel, therefore, the drive axle is mounted from above, such that it extends through the phase boundary to the environment. If the drive axle is mounted at the bottom, in the vessel, the shaft must be provided with a shaft seal in order to prevent the product from escaping along the drive axle. If the product is highly viscous, it winds around the shaft and may escape via the drive axle. Since there is no defined phase boundary, however, the gas phase may then also escape via the drive axle. In many cases, the gas phase, likewise, must not come into contact with the environment. The vessel may be under pressure or vacuum, which further complicates sealing of the shaft.

Frictional bodies are used to seal the shaft, one being a rotating body (on the rotor) and fitting closely against the other, static body (on the stator), the two bodies rubbing on each other with minimal play. The amount of leakage via the shaft is thus kept small. Adapting the pressure to the frictional bodies enables the leakage to be adjusted, but it cannot be stopped.

Such a design has long been known, and one may cite a gland seal for a plastic and a rigid frictional body, a floating ring seal for two rigid frictional bodies, and a shaft sealing ring for an elastic and a rigid frictional body.

It has also long been known that it is advantageous to apply a lubricant in the region of the friction, in order to reduce the friction and, consequently, the wear. This substantially prolongs the service life of the frictional body. The lubricant may be the product itself or a substrate that is compatible with the product.

The leakage is the substrate that flows according to the pressure difference in the gap between the frictional bodies. In the case of a gaseous leakage, if there is an increasing pressure difference between the product space and the environment, very high volumetric leakage rates occur. It is therefore advantageous to fill the gap with a liquid of medium viscosity. The leakage then consists of this liquid, and its quantity is very much smaller, according to its greater viscosity. If the antechamber for the seal is filled completely with a liquid, the term blocking liquid is used. This method, likewise, has been known for a long time. It is usual to install two successive seals, between which the blocking liquid is held under increased pressure. The leakage is compensated by a connection to a vessel that is filled with the blocking liquid.

The aforementioned method with blocking liquid has the disadvantage that two frictional seals are required on the shaft. These seals require more space on the shaft, and this is not always available. If one of the two seals fails, this results in an increased, even uncontrolled, inflow of blocking liquid into the product space or into the environment. Since the other seal might continue to function for a while, the operator does not discover this leakage immediately.

It has been found that there is a greater occurrence of leakages in the case of shafts that rotate with a slight eccentricity, because viscous forces occur in the product space. In the case of the gland seal, the plastic frictional body (the gland seal cord) deforms in such a manner that the occurrence of leakages may increase. Since the bearing is mounted on the outside, in front of the seal, the deflection of the shaft toward the product space increases. In order to reduce these leakages, according to the invention the gland seal is divided, such that there are two gland seals connected in series, the inner gland seal, which is closer to the product space, adapting to the motion of the stator, and the other, outer, gland seal adapting to the motion of the rotor. In order to achieve this, the non-following housing of the gland seal is divided. The outer gland is subjected to a force that presses against the packing, the housing of the outer gland seal being rigidly connected to the gland of the inner gland seal, such that the force on the housing of the outer packing is transmitted, via its housing and gland, to the inner packing. A gap is produced, between the inner packing and the gland, which seals as a result of the compressive force upon the gland seal cord, but which is not subjected to any frictional force. This type of division of the gland seal has already been in use for a long time, but is a prerequisite, if appropriate, for the present invention.

The disadvantage of the method of dividing the gland seal is that the inner gland seal effects only poor dynamic sealing. If a blocking and lubricating medium is put into the intermediate space between an inner and an outer gland seal, it flows easily into the product space. It is virtually impossible to maintain pressure in this intermediate space, since the pressure in the process can fluctuate, resulting in an uncontrolled flow of blocking medium into the product space. The fluctuating sealing capacity of the inner gland seal amplifies this problem.

These seals are used, for example, in appliances such as mixing kneaders, which serve a great variety of purposes. Firstly, there is vaporization with solvent recovery, this being effected batch-wise or continuously, and often also under vacuum. This is used to process, for example, distillation residues, and in particular toluene diisocyanate, but also production residues having toxic or high-boiling solvents from the chemical industry and pharmaceutical production, washing solutions and paint sludges, polymer solutions, elastomer solutions from solvent polymerization, adhesives and sealing compounds.

In addition, the appliances are used to perform continuous or batch-wise contact drying of water-moist or solvent-moist products, likewise often under vacuum. The application is primarily intended for pigments, dyes, fine chemicals, additives, such as salts, oxides, hydroxides, antioxidants, temperature-sensitive pharmaceutical and vitamin products, active substances, polymers, synthetic rubbers, polymer suspensions, latex, hydrogels, waxes, pesticides and residues from chemical or pharmaceutical production, such as salts, catalysts, drosses and spent lyes. These methods are also used in the production of foodstuffs, for example in the production and/or processing of block milk, sugar substitutes, starch derivatives, alginates, for processing industrial sludges, oil sludges, biosludges, paper sludges, paint sludges and, in general, for processing sticky, crust-forming, highly pasty products, waste products and cellulose derivatives.

A polycondensation reaction may occur in a mixing kneader, usually continuously and usually in the melt, and is used primarily in the processing of polyamides, polyesters, polyacetates, polyimides, thermoplastics, elastomers, silicones, urea resins, phenol resins, detergents and fertilizers. For example, it is used on polymer melts following a mass polymerization on derivatives of methacrylic acid.

A polymerization reaction may also occur, likewise usually continuously. This is used on polyacrylates, hydrogels, polyols, thermoplastic polymers, elastomers, syndyotactic polystyrene and polyacrylamide.

Degassing and/or devolatilization may occur in mixing kneaders. This is used on polymer melts, following (co) polymerization of a monomer or monomers, following condensation of polyester or polyamide melts, on spinning solutions for synthetic fibers, and on polymer or elastomer granulated materials or powders in the solid state.

Quite generally, solid, liquid or multiphase reactions may occur in the mixing kneader. This applies primarily to baking reactions, in the processing of hydrofluoric acid, stearates, cyanides, polyphosphates, cyanuric acids, cellulose derivatives, esters and ethers, polyacetal resins, sulfanilic acids, Cu-phthalocyanines, starch derivatives, ammonium polyphosphates, sulfonates, pesticides and fertilizers.

Furthermore, solid/gaseous reactions (e.g. carboxylation) or liquid/gaseous reactions may occur. This is used in the processing of acetates, acids, Kolbe-Schmitt reactions, e.g. BON, Na-salicylates, parahydroxybenzoates and pharmaceutical products.

Liquid/liquid reactions occur in the case of neutralization reactions and transesterification reactions.

Dissolution and/or degassing in such mixing kneaders occurs in the case of spinning solutions for synthetic fibers, polyamides, polyesters and celluloses.

So-called flushing occurs in the case of processing or production of pigments.

Solid-state post-condensation occurs in the case of production or processing of polyesters, polycarbonates and polyamides, continuous slurrying, e.g. in the case of processing of fibers, e.g. cellulose fibers, with solvents, crystallization from the melt or from solutions in the case of treatment of salts, fine chemicals, polyols, alcoholates, compounding, mixing (continuous and/or batch-wise) in the case of polymer mixes, silicone compounds, sealing compounds, fly ash, coagulation (in particular continuous) in the case of the processing of polymer suspensions.

In a mixing kneader, multifunctional processes may also be combined, for example heating, drying, melting, crystallizing, mixing, degassing, reacting—all of these either continuously or batch-wise. Polymers, elastomers, anorganic products, residues, pharmaceutical products, foodstuff products, printing inks are produced and/or processed in this way.

In mixing kneaders, vacuum sublimation/desublimation may also occur, used for cleaning chemical precursors, e.g. anthraquinone, metal chlorides, ferrocene, iodine, metalloorganic compounds, etc. In addition, pharmaceutical intermediate products can be produced.

Continuous carrier-gas desublimation occurs, for example, in the case of organic intermediate products, e.g. anthraquinone and fine chemicals.

Basically, a distinction is made between single-shaft and double-shaft mixing kneaders. A single-shaft mixing kneader is known, for example, from AT 334 328, from CH 658 798 A5 or from CH 686 406 A5. In those cases, an axially extending shaft, which is fitted with disk elements, and which rotates in a direction of rotation about a rotation axis, is disposed in a housing. This shaft causes the product to be transported in a transport direction. Between the disk elements, counter-elements are fixedly attached to the housing. The disk elements are disposed in planes perpendicular to the kneader shaft and between them form free sectors that, with the planes of adjacent disk elements, form kneading spaces.

A multi-shaft mixing and kneading machine is described in CH-A 506 322. In the latter, there are radial disk elements on a shaft, and axially aligned kneading bars disposed between the disks. Engaging between these disks, from the other frame, are mixing and kneading elements shaped in the form of a frame. These mixing and kneading elements clean the disks and the kneading bars of the first shaft. The kneading bars on both shafts, in turn, clean the inner wall of the housing.

These known double-shaft mixing kneaders have the disadvantage that, owing to the figure-of-eight housing cross section, they have a weak point in the region of the connection of the two shaft housings. In this region, when viscous products are being processed, and/or in processes that run under pressure, high stresses occur, which can only be controlled by means of elaborate design measures.

A mixing kneader of the type mentioned above is known, for example, from EP 0 517 068 B1. In that case, two axially parallel shafts rotate either in opposite directions or in the same direction in a mixer housing. Mixing bars mounted on disk elements act in combination with each other in this case. Besides the function of mixing, the mixing bars perform the function of cleaning, as well as possible, surfaces of the mixer housing and of the shafts and disk elements that are in contact with the product, and thereby preventing unmixed zones. Particularly in the case of highly compacting products that harden and form a crust, the edge running of the mixing bars results in high local mechanical loads on the mixing bars and the shafts. These force peaks occur, in particular, as the mixing bars engage in those zones where the product cannot easily escape. Such zones exist, for example, where the disk elements are mounted on the shaft.

Also known, from DE 199 40 521 A1, is a mixing kneader of the type mentioned above in which the carrying elements, in the region of the kneading bars, form a recess, such that the kneading bars have an axial extent that is as great as possible. Such a mixing kneader has excellent self-cleaning of all surfaces of the housing and of the shafts that are in contact with the product, but has the characteristic that, owing to the ranges of the kneading bars, the carrying elements of the kneading bars necessitate recesses that result in complicated carrying element shapes. This results, firstly, in an elaborate production process and, secondly, in the case of mechanical loading, in local stress peaks on the shaft and the carrying elements. These stress peaks, which occur mainly in the case of the sharp-edged recesses and changes of thickness, in particular in the region where the carrying elements are welded on to the shaft core, cause cracks in the shaft and the carrying elements because of material fatigue.

In the case of this arrangement according to U.S. Pat. No. 2,684,274 A, three seals are shown, which are each separated by a chamber, which can be filled with lubricant.

In the case of an arrangement according to U.S. Pat. No. 2,864,631 A, a multiplicity of sealing rings are disposed around a shaft. Almost every sealing ring has its own supply for a lubricant.

In the case of an arrangement according to GB 1 081 867 A, two seals of the same type are shown, which are separated from each other only by a space. The lubricant is distributed automatically into the two rings of the seal.

GB 1 088 035 A shows an apparatus in which only one gland seal and one further, mechanical seal is provided. Before the gland seal there is a chamber, which is filled with a liquid monomer of the same type as the actual product space. For the mechanical seal, a chamber is provided, into which the lubricant for the mechanical sealing surfaces is filled.

It is the object of the present invention to substantially improve sealing of the bearing arrangement of a rotating shaft in relation to a fixed housing or housing parts.

SUMMARY OF THE INVENTION

The object is achieved in that, in the case of vacuum operation, a defined quantity of liquid, which serves as a blocking and lubricating medium for the dynamic seal of the shaft toward the housing part, is applied to the dynamic seal from the outside, which liquid, apart from a residual excess, is drawn into the dynamic seal by the vacuum therewithin and thereby forms an effective block and seal, whereas, in the case of pressure operation, the blocking and lubricating liquid is introduced between the dynamic seal and the other seal.

The problem of increased leakages of blocking agent and lubricant is solved as follows:

In the case of vacuum operation, a metering device is used to apply the combined blocking and lubricating liquid to the outer gland seal, from the outside. The metered quantity of blocking and lubricating liquid is set such that a possible excess quantity drips down from the shaft, which does not draw into the gland seal because of the negative pressure. The correct quantity can be set by collecting and quantifying the blocking and lubricating liquid that drips from the shaft.

In the case of pressure operation, the blocking and lubricating liquid is applied close to the outer gland seal, from the inside. To correctly set the quantity of blocking and lubricating liquid, the product may be analyzed, or the excess blocking and lubricating liquid is stripped from the shaft by a stripper or ring on the shaft, and collected in a container with a sluice system on the lower part of the housing, and quantified.

The described system for stripping the blocking and lubricating liquid may also be advantageous in the case of vacuum operation, in which case it does not strip off the excess blocking and lubricating liquid, but the sealing blocking and lubricating liquid, and thus prevents the latter from entering the product space.

It is important to emphasize that, with the invention described, atmospheric operation in the product space is not possible. There should be at least a slight negative pressure or positive pressure in the product space, because otherwise the blocking and lubricating liquid does not flow into the gland seal, it then no longer lubricates the latter and the cords become damaged by friction.

The design of the metering device for the blocking and lubricating liquid is of great importance. It should deliver a constant flow of blocking and lubricating liquid. Volumetric metering pumps are possible in principle, but in practice they are expensive and demanding in terms of maintenance. According to the invention, a solution is introduced by means of a drip-feed oiler, which is mounted above the metering point. The drip-feed oiler is based on the effect that the hydrostatic pressure before the setting valve is greater than on the container level surface. A prerequisite for frictionless operation is that the pressure after the setting valve corresponds to that on the container level surface. In one design of this invention, an equalizing line is installed, which connects the space of the level surface to the metering point.

A nitrogen supply line may be assigned to the closed blocking and lubricating liquid space, the supplied quantity of nitrogen being regulated, and the pressure level being set by means of an overflow valve. The advantage of this apparatus is that the space and the metering point are then simultaneously rendered inert by the nitrogen, via the equalizing line.

A further, improved measure of this invention is the monitoring of the gland seal friction by means of a temperature probe on the packing. The presence of lubricant can thus be checked during operation, since otherwise the increased friction results in a characteristic rise in temperature.

The invention also allows reciprocal positive-pressure operation or vacuum operation in the product space. In this case, the blocking and lubricating liquid supply line is split, and metered in by means of shut-off valves before or after the outer packing. Clearly, a separate metering unit is likewise possible.

A combination of this invention with a pneumatic pressing-on of the seal (see DE10153293) has likewise proved to be advantageous.

BRIEF DESCRIPTION OF THE DRAWINGS

Further advantages, features and details of the invention are disclosed by the following description of preferred exemplary embodiments, and with reference to the drawing; the latter shows, in FIG. 1 a longitudinal portion of a bearing arrangement of a rotating shaft, after the shaft extends out through a stationary housing that encloses a product space in which the pressure is less than outside it.

DETAILED DESCRIPTION

Figure 1:
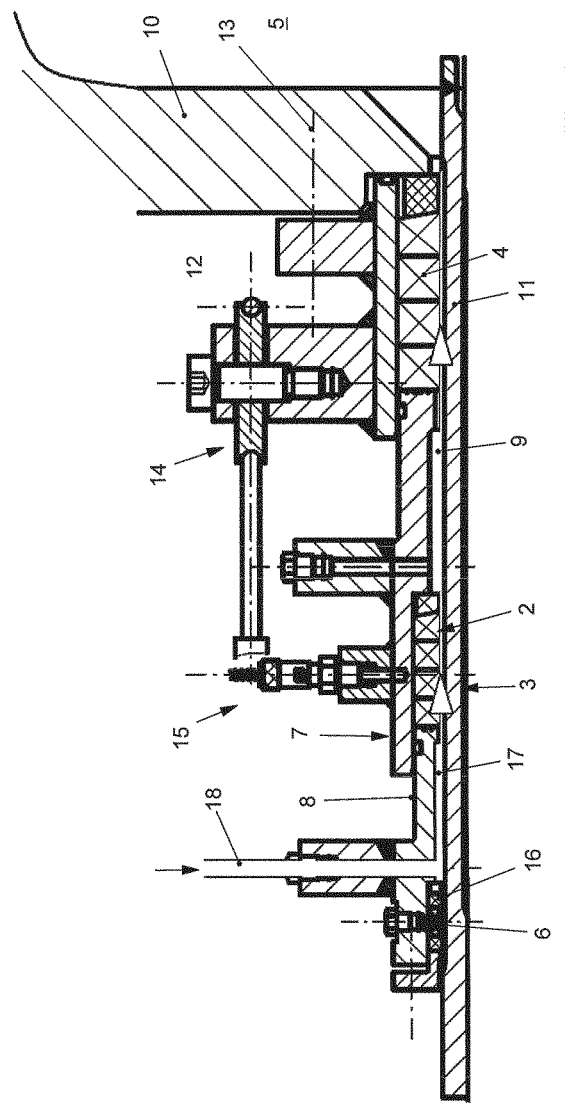

According to FIG. 1, a fixed housing 10 encloses a product space 5, in which there is a product to be processed. This product is processed by mixing and kneading elements, not shown in greater detail, which are located on a rotating shaft 3. Such mixing and kneading elements are to be found, for example, in the documents cited in the prior art.

A drive axle 11 of the shaft 3 extends through the housing 10, such that the drive axle 11 is disposed outside of the housing 10. There, it is encompassed by a plurality of housing parts. These housing parts are realized in the shape of a ring.

A first housing part 12 is fixed, and connected to the housing 10 by connecting means 13, indicated by a dot-dash line. Provided between this first housing part 12 and the rotating shaft, or drive axle 11, there is a first seal, which is composed of elastic compensation elements 4.

Extending under the first housing part 12 there is a second housing part 7, which may also be designated as a packing housing 7. The packing housing 7 and the first housing part 12 in this case are connected to each other by tie rods 14, such that the packing housing 7 is pressed against the elastic compensation elements 4 and tensions the latter.

In addition, the packing housing 7 bears against the rotating drive axle 11 via a gland seal packing 2, a dynamic seal being produced as a result, which follows an eccentric motion of the drive axle 11. This gland seal packing 2 can be pressurized via a pneumatic connection 15.

Figure 2:
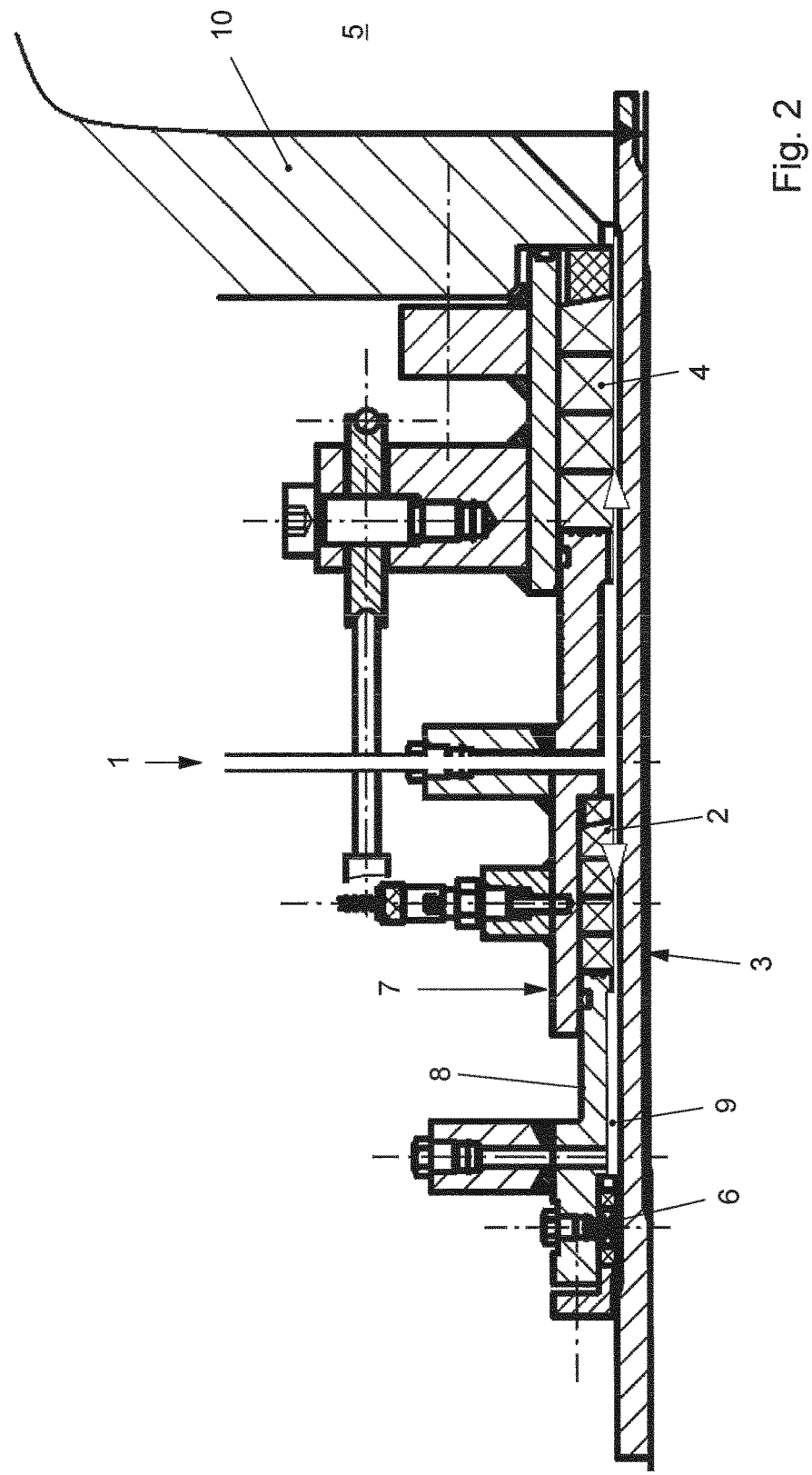
FIG. 2 a partial longitudinal section of a rotating shaft, after the shaft extends out through a stationary housing that encloses a product space in which the pressure is greater than outside it.

Provided between the gland seal packing 2 and the elastic compensation elements 4 there is a collecting space 9, opening into which there is a supply line 1, which is shown in FIG. 2.

A further housing part 8 extends under the packing housing 7, and serves to press on the gland seal. For this purpose, also, tie rods, not shown in greater detail, are provided between the packing housing 7 and this further housing part 8. In addition, this housing part 8 bears against the drive axle, via seals 16, a connection 6 for a nitrogen overlay also being provided in the region of the seal 16.

Provided between this seal 16 and the gland seal packing 2 there is a collecting space 17, opening into which there is a supply line 18.

The functioning of the present invention is as follows:

In the case of the arrangement shown in FIG. 1, the supply line 1 is closed, whereas the supply line 18 is open. This means that blocking and lubricating medium can pass through the supply line 18 into the collecting space 17. In this case, the pressure in the product space 5 is less than outside it, i.e. there is a certain vacuum, such that the blocking and lubricating medium is sucked through the gland seal packing 2. In this way, it can perform its function as a blocking and lubricating medium, both for the gland seal packing 2 and for the elastic compensation elements 4.

If, on the other hand, there is a pressure prevailing in the product space that is greater than outside it, i.e. a positive pressure, the arrangement according to FIG. 2 is applied. This means that blocking and lubricating medium is introduced, through the supply line 1, into the collecting space 9, where it can penetrate both the elastic compensation elements 4 and the gland seal packing 2.

The invention claimed is:

1. A method for processing a highly viscous, pasty product, by at least one rotating shaft (3, 11) in a product space (5), wherein a drive axle (11) of the shaft (3) is mounted and sealed outside of the product space (5), in a housing composed of a plurality of parts (7, 8, 12), and the sealing is effected by at least two seals (2, 4), wherein a dynamic seal (2) follows an eccentric motion of the shaft (3) and effects dynamic sealing of the rotating shaft (3), while another seal (4), by plastic or elastic deformation, compensates an eccentric motion of the shaft (3) in relation to the housing and thus prevents an untightness between the eccentrically moving housing part (12) and a rigid housing (10), wherein, in the case of vacuum operation, a defined quantity of liquid, which serves as a blocking and lubricating medium for the dynamic seal (2) of the shaft (3) toward the housing part (7), is applied to the dynamic seal (2) from the outside, which liquid, apart from a residual excess, is drawn into the dynamic seal (2) by the vacuum therewithin and thereby forms an effective block and seal, whereas, in the case of pressure operation, the blocking and lubricating liquid is introduced between the dynamic seal (2) and the other seal (4).

2. The method as claimed in claim 1, wherein an excess of blocking and lubricating medium is collected and measured, in order to minimize the blocking and lubricating medium by setting the metered quantity according to this excess, but always to provide a sufficient metered quantity for the effective dynamic seal (2) of a shaft through-extension.

3. The method as claimed in claim 1, wherein blocking and lubricating medium that flows through the seal (2) or that accrues as excess before the seal is separated off mechanically and collected, and if necessary is removed via a sluice.

4. The method as claimed in claim 1, wherein a friction of the seal (2) is monitored by temperature measurement.

5. The method as claimed in claim 1, wherein the seal (2) is pressed pneumatically against the rotating shaft (3, 11).

6. An apparatus for processing a highly viscous, pasty-like product, by means of at least one rotating shaft (3, 11) in a product space (5), wherein a drive axle (11) of the shaft (3) is mounted and sealed outside of the product space (5), in a housing composed of a plurality of parts (7, 8, 12), and the sealing is effected by at least two seals (2, 4), wherein a dynamic seal (2) follows an eccentric motion of the shaft (3) and effects dynamic sealing of the rotating shaft (3), while another seal (4), by plastic or elastic deformation, compensates an eccentric motion of the shaft (3) in relation to the housing and thus prevents an untightness between the eccentrically moving housing part (12) and a rigid housing (10), comprising a collecting space (9, 17), between the shaft (3) and housing parts (7, 12), for receiving a metered blocking and lubricating medium, is assigned to the dynamic seal (2) on both sides, that is, a collecting space (17) before the dynamic seal (2), for receiving the medium in the case of vacuum operation, and a collecting space (9) between the dynamic seal (2) and another seal in the case of pressure operation.

7. The apparatus as claimed in claim 6, wherein a supply line (1, 18) for the blocking and lubricating medium is closed into at least one collecting space (9, 17).

8. The apparatus as claimed in claim 7, wherein a metering pump is provided for metering the blocking and lubricating medium.

9. The apparatus as claimed in claim 7, wherein the metering of blocking and lubricating medium is effected by means of a drip-feed oiler.

10. The apparatus as claimed in claim 9, wherein a separate equalizing line is provided between a gas surface of the drip-feed oil container and a metering point of the blocking and lubricating medium.

11. The apparatus as claimed in claim 9, wherein inerting gas can be supplied to the drip-feed oil gas space via a separate equalizing line, and the quantity and the pressure level in the drip-feed oil gas space can be set.

12. The apparatus as claimed in claim 6, wherein a nitrogen overlay (6) is assigned to at least one collecting space (17).

* * * * *